United States Patent [19]

Finch et al.

[11] Patent Number: 5,275,248

[45] Date of Patent: Jan. 4, 1994

[54] POWER OPERATED WHEELCHAIR

[76] Inventors: Thomas E. Finch; James A. Finch, both of HCR1, Box 3482, Springbranch, Tex. 78070

[21] Appl. No.: 29,437

[22] Filed: Mar. 11, 1993

[51] Int. Cl.[5] .............................. B60K 1/02
[52] U.S. Cl. .................. 180/65.6; 180/907; 180/6.44
[58] Field of Search .............. 180/65.6, 65.7, 907, 180/6.44, 6.5; 280/642, 250.1

[56] References Cited

U.S. PATENT DOCUMENTS

| | | |
|---|---|---|
| 2,027,218 | 1/1936 | Armington . |
| 2,047,050 | 7/1936 | Armington . |
| 2,196,368 | 4/1940 | Thomson . |
| 2,560,554 | 7/1951 | Colby . |
| 2,586,273 | 2/1952 | Steven .................. 180/65.6 X |
| 2,689,488 | 9/1954 | Storer, Jr. et al. . |
| 3,450,218 | 6/1969 | Looker . |
| 3,534,825 | 10/1970 | Reffle .................. 180/65.6 X |
| 3,930,551 | 1/1976 | Cragg .................. 180/65.6 |
| 3,965,401 | 6/1976 | Mogle .................. 318/55 |
| 4,157,123 | 6/1979 | Rodaway .................. 180/6.5 |
| 4,207,959 | 6/1980 | Youdin et al. .................. 180/167 |
| 4,489,256 | 12/1984 | Brodsky .................. 318/87 |
| 4,634,941 | 1/1987 | Klimo .................. 318/139 |
| 4,823,900 | 4/1989 | Farnam .................. 180/6.5 |
| 4,926,952 | 5/1990 | Farnam .................. 180/6.5 |
| 4,998,591 | 3/1991 | Zaunberger .................. 180/6.44 |
| 5,094,310 | 3/1992 | Richey et al. .................. 180/65.6 |

FOREIGN PATENT DOCUMENTS

| | | |
|---|---|---|
| 2842076 | 4/1980 | Fed. Rep. of Germany ... 180/DIG. 907 |
| 0011419 | 1/1990 | Japan .................. 180/65.6 |
| 1331670 | 8/1987 | U.S.S.R. .................. 180/65.6 |

Primary Examiner—Margaret A. Focarino
Assistant Examiner—Carla Mattix
Attorney, Agent, or Firm—Cox & Smith

[57] ABSTRACT

A power-driven and steered wheelchair comprises a pair of ground-engaging wheels mounted in laterally-spaced relationship to a frame carrying a seat for an occupant and supporting the power source and a transaxle transmission for imparting parting both driving and steering power to the ground-engaging wheels. Steering is accomplished by employing separate planetary drive mechanisms for each of the primary ground-engaging wheels and imparting rotation in opposite directions to the ring gears of such planetary drive mechanisms to effect the rotation of one wheel at a greater speed than the other wheel in either a forward or rearward direction, thus producing power steering of the wheelchair.

10 Claims, 6 Drawing Sheets

POWER OPERATED WHEELCHAIR

BACKGROUND OF THE INVENTION

1. Field of the Invention

The invention relates to a wheelchair for invalids, and particularly for individuals having a permanent handicap, which utilizes battery driven, combustion driven, hydraulically driven or generator driven motors for effecting the driving of the main wheels of the wheelchair and the steering thereof.

2. Summary of the Prior Art

Power operated wheelchairs have long been known in the prior art. The vast majority of previously issued patents, however, disclosed power operated wheelchairs wherein a separate driving motor was provided for each of the two driving wheels of the wheelchair.

As is well known to wheelchair occupants, whenever a conventional power operated wheelchair, having two power driven wheels and two castering wheels for steering, is driven along the side of a slope, the wheelchair will always tend to turn from a desired direction relative to the slope due to the tendency of the castering wheels to turn downwardly regardless of whether the castering wheels are forwardly or rearwardly located relative to the power driven wheels. The maintenance of steering in a desired direction becomes a difficult task, particularly to seriously handicapped individuals who may have to resort to the use of finger operated electrical switches, or in severe cases, to switches operated by movements of the head. Another difficulty with the conventional powered wheelchair lies in the fact that such wheelchairs generally have the power wheels mounted rearwardly of the center of gravity of the wheelchair when the occupant is sitting in the wheelchair. If, by inadvertence, full forward power is supplied to the driving wheels, or when climbing a steep slope, there is a definite tendency for the wheelchair to tilt backwardly, and in many cases to overturn, due to the location of the center of gravity of the wheelchair assemblage and occupant just forward and well above the power driven wheels.

Wheelchairs are also known to have power driven wheels located forwardly of the center of gravity of the wheelchair and castering or steerable wheels are provided rearwardly of the center of gravity. These wheelchairs are extremely difficult to steer due to the fact that the non steerable wheels will only find directional equilibrium when trailing the center of gravity. Manufacturers of this type of wheelchair have resorted to power steering of the castering wheels with limitations normally imposed with this system.

It is therefore obvious that improvements are sorely needed in the art of power driven, steerable wheelchairs in order to overcome each of the aforementioned disadvantages of the prior art wheelchair designs.

SUMMARY OF THE INVENTION

A power operated wheelchair embodying this invention employs a pair of primary ground-engaging wheels which are concurrently driven by a single motor through a unique planetary transaxle. The frame of the wheelchair defines a seat for the occupant, a support for batteries or another motive source, and a mounting for a gearbox casing for housing the transaxle. The frame further defines two laterally spaced bearing mounts for axles upon which the two laterally spaced driving wheels are mounted. One, or preferably, two castering wheels are provided on the frame rearwardly of the primary power driven wheels. The design is such that the center of gravity of the wheelchair, including the occupant, is located rearwardly of the power driven wheels. As mentioned, the wheels are driven by a motor through a unique planetary transaxle having a common input gear driving two separate sets of planet gears. The driving motor has a geared connection to the common input gear of the two planetary systems. The input gear has two oppositely axially projecting shafts, each with an integral pinion sun gear, which shafts are respectively mounted in bearings provided in the inner ends of the two axles which support the primary ground-engaging wheels. Additionally, the driving axles are each provided with radial flanges upon which are mounted a plurality of planet gears in radially spaced relationship which engage the sun gear teeth provided on opposite sides of input gear.

A pair of ring gears having both internal and external teeth are provided. Such ring gears are respectively mounted in bearing relationship around the exterior of the inner ends of the axle shafts supporting the primary ground-engaging wheels. The internal teeth on the ring gears respectively engage the adjacent set of planetary gears. If no restraints are imposed on the rotation of the ring gears, then the primary ground engaging wheels are effectively disposed in a free wheeling condition and rotation of the driving motor will not result in any rotation of the primary wheels, permitting the wheelchair to be manually pushed in the event of a driving motor failure.

In accordance with this invention, the outer gear teeth provided on the two ring gears are normally engaged with a reversible steering motor by a gear train which includes a worm gear. The worm gear is preferably connected to the shaft of the reversible steering motor. The gearing connection is such that rotation of the steering motor effects rotation of the two ring gears in opposite directions. This results in an immediate turning action of the wheelchair due to the opposite rotation of the two primary wheels relative to each other. Even if no power is concurrently supplied to the primary ground-engaging wheels from the driving motor, the operation of the steering motor in a selected direction will cause the wheelchair to effectively rotate by opposite rotation of the primary ground-engaging wheels. If the driving motor is energized, then the relative speed of the steering motor determines how fast the turn will be made. Suitable conventional motor controls may be incorporated in the control circuit for the steering motor, or the gearing may be proportioned to prevent the gear train from the steering motor from reaching a speed which would cause a wheelchair to turn too rapidly while it is progressing either forwardly or rearwardly under power supplied by the driving motor.

When no power is supplied to the steering motor, the wheelchair will track in a positively straight direction since the two shafts driving the primary ground-engaging wheels are effectively locked together for co-rotation by virtue of the gearing connection to the steering motor which includes a worm gear preventing backward transmission of rotation to the steering motor.

Thus, the problem of maintaining the direction of the wheelchair when moving along a side slope is completely overcome since both primary ground-engaging wheels will automatically turn at the same speed and prevent the castering wheels from turning down the slope, particularly when the castering wheels are disposed in trailing relation to the primary wheels.

Additionally, the sudden application of forward movement to the power wheelchair will not result in a rearward tipping of the wheelchair due to the location of the castering wheels and the center of gravity of the wheelchair in a position rearwardly of the power driving wheels.

Other advantages of the invention will become readily apparent to those skilled in the art from the following detailed description, taken in conjunction with the annexed sheets of drawings on which is schematically shown a preferred embodiment of the invention.

BRIEF DESCRIPTION OF DRAWINGS

FIG. 2a.1 is an enlarged scale view of the portion of FIG. 2a, 2b and FIG. 3 which is defined by the circle appearing in the center of each of these figures.

DESCRIPTION OF PREFERRED EMBODIMENT

Figure 1:
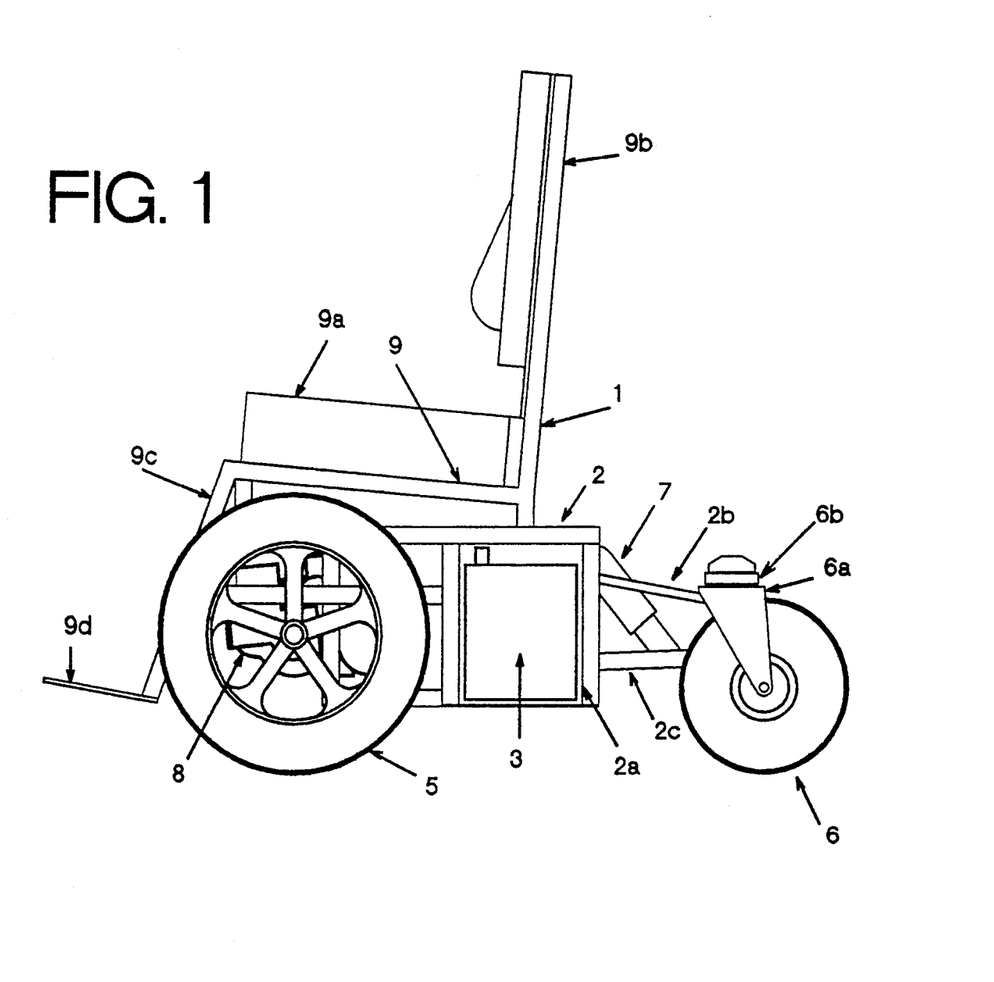
FIG. 1 is a schematic side elevational view of a wheelchair having a power driving and steering mechanism embodying this invention.

Referring to FIG. 1, there is schematically shown a wheelchair 1 incorporating a preferred embodiment of this invention. Wheelchair 1 comprises an articulated frame 2, having the various frame elements conventionally secured together by welding or by mechanical fasteners. Frame 2 defines a battery compartment 2a within which batteries 3 are mounted. Frame 2 incorporates a transaxle gearbox 8. Gearbox 8 incorporates a pair of laterally spaced axle-mounting bearings 8a (FIGS. 2a, 2b, 3, 4, & 5) which respectively rotatively support a pair of similar hollow axle shafts 4 for rotation about a horizontal axis. Ground-engaging wheels 5 of sufficient size are mounted on the outer ends of the axles 4 that project laterally beyond frame 2.

Projecting rearwardly from frame 2 are a pair of upper links 2b and a lower swing arm 2c which form a parallelogram and terminate into a cross-member 6b which incorporates two vertical axis hubs 6a for journaling two laterally-spaced, castering rear wheels 6. The vertical position of rear wheels 6 relative to the frame 2 may be varied by a spring/shock absorber link 7 mounted between the parallelogram links 2b to the lower swing arm 2c and the upper rear portion of the frame 2. Link 7 may be either a gas cylinder or a spring, depending on the preference of the operator propelling the wheelchair 1. The gas cylinder or spring may incorporate a viscous damped cylinder.

A seat structure 9, having a seat element 9a which may be cushioned, a back portion 9b which may be reclinable, a forwardly and downwardly projecting leg support 9c and conventional foot supports 9d are conventionally mounted on the frame 2. It will be particularly noted that with the described configuration, the center of gravity of the structure, including the weight of the occupant of the seat, is disposed rearwardly of the horizontal axis of rotation of the primary ground-engaging wheels 5 due to the weight of the battery, or other power source to be later discussed, being disposed rearwardly of the axis of the ground-engaging wheels 5.

A transaxle gear box casing 8 for housing and rotatably mounting various driving gears is provided between the primary ground-engaging wheels 5. Such transaxle gear box casing is only shown schematically in FIG. 1. For clarity of illustration of the plurality of gear elements incorporated within the transaxle gear box casing, the casing is omitted in FIGS. 2a, 2b, 3, 4, 5, and 6. The various elements contained in such casing are indicated by numerals 8a, 8b, etc.

Figure 2A:
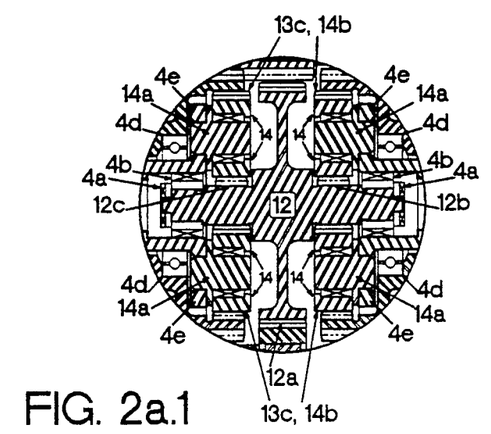
Figure 2A:
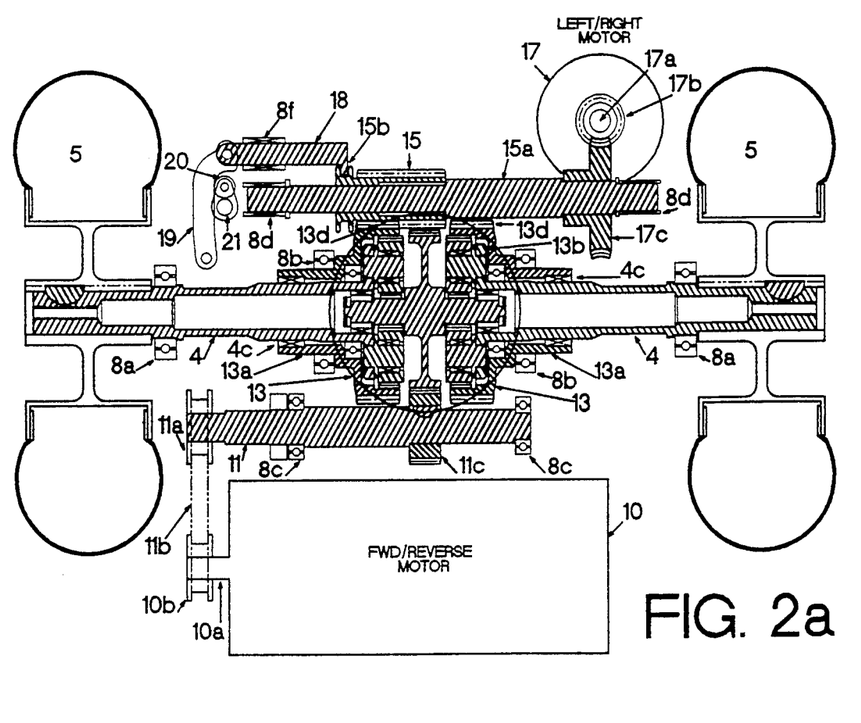
FIG. 2a is a sectional view of the driving and steering mechanism with the transaxle case and the intermediate steering gear and shaft removed for clarity of illustration. This sectional view details the driving motor drive train for the primary ground-engaging wheels to simultaneously rotate said wheels in a forward or reverse direction.

Referring to FIG. 2a, assuming that a battery-powered, reversible DC motor is to be utilized as the power source, such motor 10 is conventionally supported on either the frame 2 or the transaxle casing 8 with its axis parallel to the axis of wheels 5, and has a horizontal output shaft 10a on which is mounted a pulley or a sprocket 10b for imparting rotation to a horizontal transverse shaft 11 supported by laterally-spaced bearings 8c provided in the transaxle gearbox casing 8. Shaft 11 has a pulley or sprocket 11a mounted thereon which is engaged by a power-transfer belt or chain 11b to thus effect the driving of the shaft 11 in a forward or reverse direction depending upon the directional energization of the driving motor 10.

On the medial portion of the shaft 11, a small gear 11c is mounted which drivingly engages external teeth 12a provided on an input gear 12. Input gear 12 has two oppositely laterally projecting coaxial shaft portions 12b and 12c, which are respectively journaled in a pair of bearings 4a and axially controlled by a pair of thrust bearings 4b provided in the bores of the hollow wheel-supporting axle shafts 4.

The input gear 12 also defines two laterally-spaced sun gears 12b and 12c of two separate, but identical, laterally spaced planetary gear systems, which are respectively operatively connected to the primary ground-engaging wheels 5.

Figure 2B:
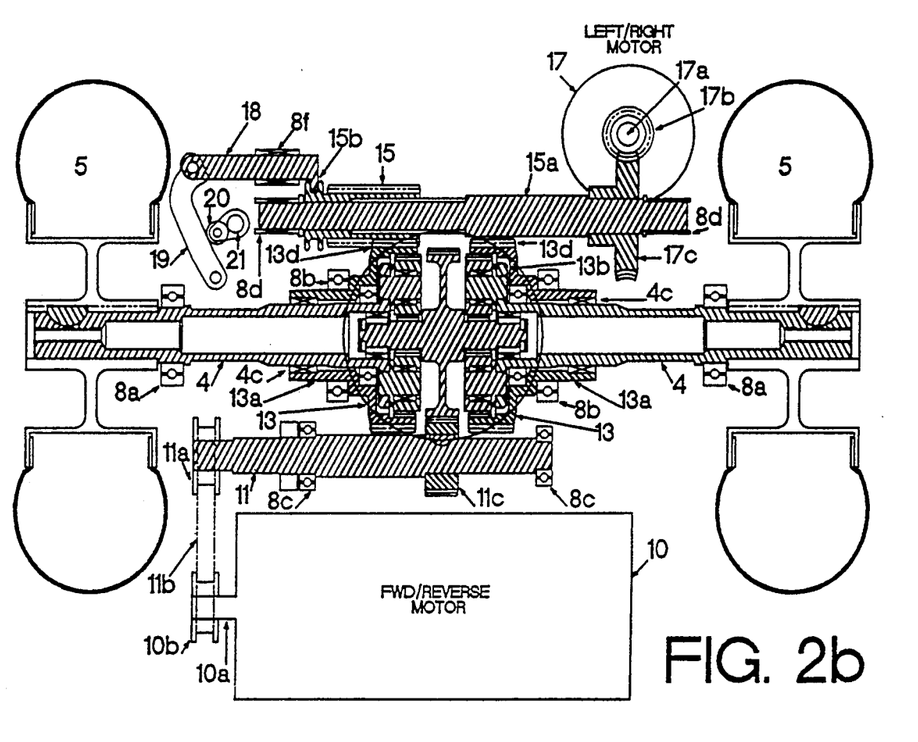
FIG. 2b is a sectional view similar to that of FIG. 2a but illustrating (as in FIG. 5) the shifting of a slidable gear in the steering motor drive train to effect the disconnection of the two ring gears from the steering motor and thus permit the primary ground-engaging wheels to be in a free wheeling mode so as to permit pushing of the wheelchair without power energization.
Figure 3:
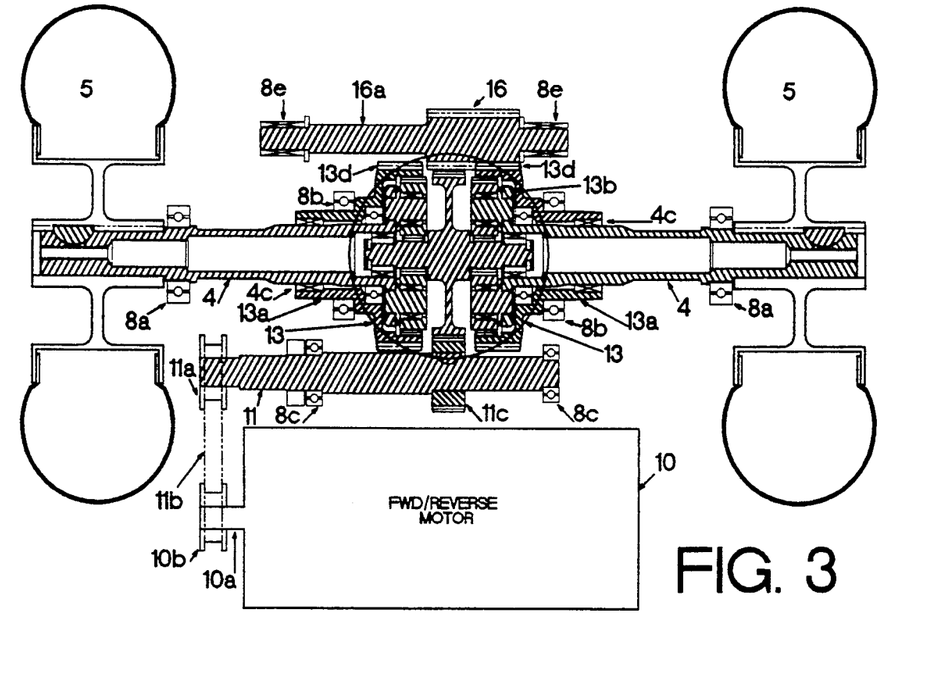
FIG. 3 is a sectional view detailing the driving motor drive train as shown in FIGS. 2a and 2b. Also shown is the intermediate steering gear and shaft omitted from FIGS. 2a and 2b for clarity of illustration.
Figure 4:
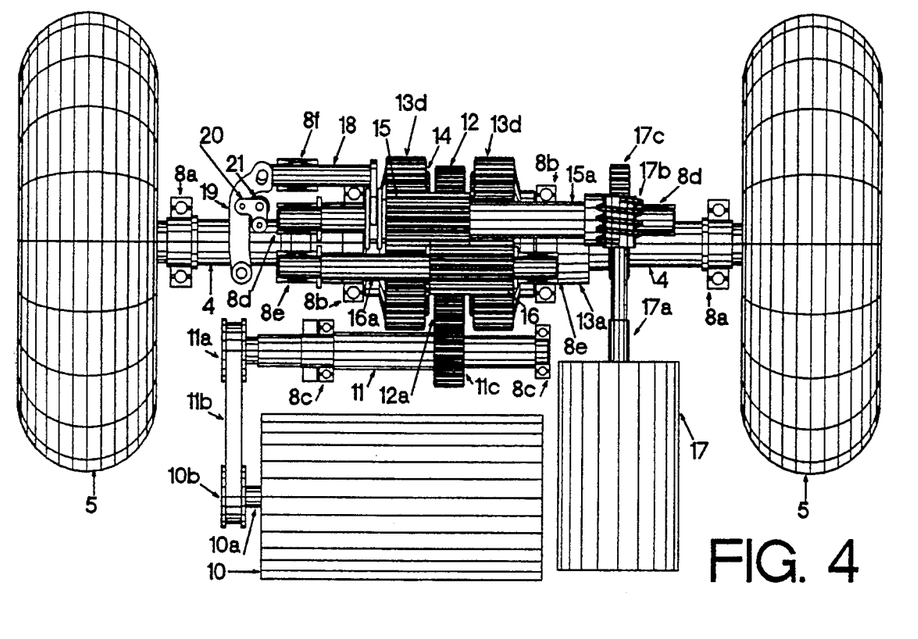
FIG. 4 is a top plan view with the transaxle gearbox housing removed for clarity of illustration. This view illustrates the driving and steering mechanism with the gearing disposed in the normal operating position.

Each such planetary system comprises a hollow gear mounting element 13 (FIGS. 2a, 2b, & 3). Each mounting element 13 has a reduced diameter portion 13a at one end, which is supported in a bearing relationship upon the exterior of the internal ends of the wheel-mounting axle shafts 4 by laterally-spaced bearing elements 4c and 4d. Additionally, bearing elements 8b, provided in transaxle casing 8, respectively support the external surfaces of the reduced diameter portions 13a of the hollow gear mountings 13.

A plurality of planetary gears 14 are mounted in angularly spaced relationship within the enlarged diameter inner end 13b of each planetary gear mounting unit 13 by shafts 14a, which are fixedly mounted in a radial flange 4e provided on the inner end of each wheel mounting axle 4. The external teeth 14b on each planetary gear 14 are in an engagement with internal teeth 13c provided on the interior of the large diameter end portion 13b of the planetary gear mounting 13, thus functioning as ring gears for the planetary system. Therefore, if the planetary gear mounting units 13 are in some manner non-rotatably secured together, rotation imparted to the planetary system through the input gear 12 would result in rotation of each of the primary ground-engaging wheels 5 at the same speed and in the same direction. When, however, the planetary gear mountings 13 are not secured and allowed to rotate freely, then no driving connection is provided between the input gear 12 and the axles 4 (FIGS. 2b & 5), and the ground-engaging wheels 5 can move independently of whether the driving motor 10 is rotating or is stationary. This permits pushing of the wheelchair in the event of motor or battery failure.

The selective interconnection of the planetary gear mountings 13, and the application of oppositely directed steering rotation of the planetary gear mountings 13 is accomplished, in accordance with this invention, to effect power steering of the wheelchair 1 by the primary ground-engaging wheels 5.

Shaft 15a (FIGS. 2a & 2b) journaled in suitable bearings 8d in the gearbox casing 8 has a limited length spline portion 15c which mounts an internally splined sliding gear 15. Sliding gear 15 is always in engagement with one set of external teeth 13d provided on the planetary gear mountings 13. In one position of its sliding movement, slidable gear 15 also simultaneously engages the splines 15c on shaft 15a and an intermediate gear 16 (omitted in FIG. 2a & 2b but shown in FIG. 3 for clarity), which is mounted on a horizontal shaft 16a journaled in bearings 8e, provided in transaxle casing 8, and engages the external teeth 13d on the other planetary gear mounting 13. Thus, rotation of shaft 15a will impart rotation in opposite directions to the two planetary gear mountings 13.

The power for effecting such oppositely directed rotation is derived from a reversible DC motor 17 which is suitably mounted on either frame 2 or the transaxle gearbox casing 8 with its axis perpendicular to the axis of the primary driving wheels 5, and has a projecting shaft 17a mounting a self-locking worm 17b. Worm 17b engages external teeth of worm gear 17c which is keyed to the shaft 15a, thus effecting rotation of the internally splined slidable gear 15 and the intermediately shifted motion reversing gear 16, resulting in opposite rotation of the two planetary gear mountings 13, hence opposite rotation of the power driven primary ground engaging wheels 5. Thus, the energization of the steering motor 17 can cause the steering of the wheelchair 1 to be accomplished solely by the power-driven primary ground-engaging wheels 5.

If no power is being supplied to the transmission by the driving motor 10, the energization of the steering motor 17 will cause the wheelchair to, in effect, turn about its own central vertical axis. If no power is being supplied to the gearbox by the steering motor 17, the energization of the driving motor 10 will cause the wheelchair to move forward or reverse in a straight line. Because the worm 17b and worm gear 17c are self-locking and cannot be backdriven, no amount of side-load will cause the wheelchair to deviate from its desired direction until the main ground-engaging wheels are made to skid.

Figure 5:
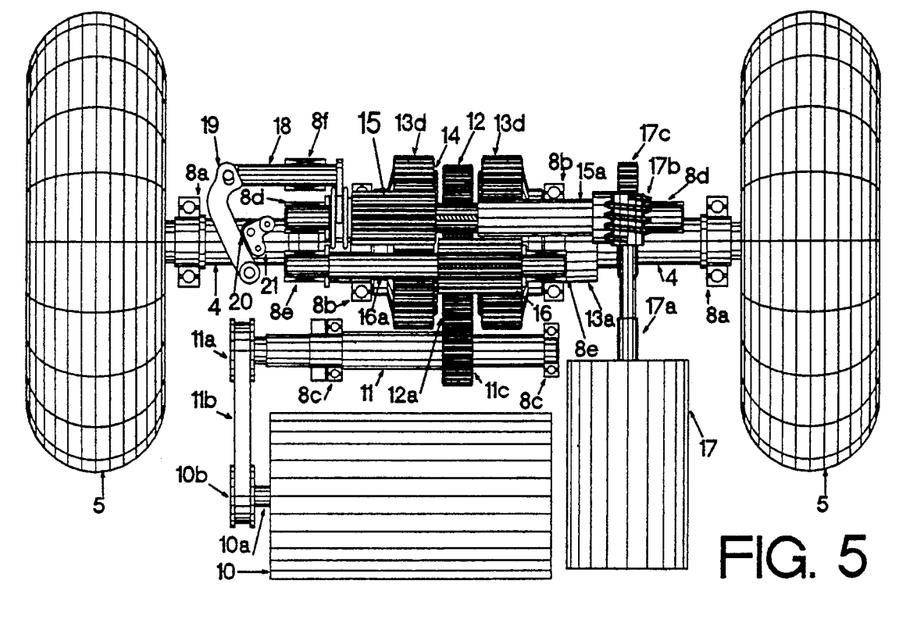
FIG. 5 is a view similar to FIG. 4 but illustrating the shifting of a slidable gear in the steering motor drive train to effect the disconnection of the two ring gears as noted in FIG. 2b.

When the internally splined slidable gear element 15 is laterally shifted to the position indicated in FIGS. 2b and 5, then slidable gear 15 will be out of engagement with both the external splines 15c on shaft 15a and the intermediate gear 16, thereby removing the connection between the two planetary gear mounting units 13, and thus allowing the two planetary gear mountings 13 to rotate freely and independently, hence the wheelchair may be manually moved in either direction regardless of whether the drive motor 10 is operating or not. The sliding of gear 15 on shaft 15a between its two mentioned positions can be manually accomplished by a shifting fork 18 journaled in a bushing 8f provided in transaxle casing 8 and engaging a peripheral groove 15b provided on one end of slidable gear 15. Shifting fork 18 may be operated manually, electrically, or hydraulically. For example, a link 19 is secured to the end of fork 18 and actuated by a cam 20 provided on the end of a shaft 21. Turning shaft 21 will shift fork 18 between its two positions.

If the wheelchair is stationary, and by inadvertence, full-forward power is applied to the primary ground-engaging wheels 5, the wheelchair will not tip over due to the location of the center of gravity of the entire structure behind the ground-engaging wheels 5 and the additional support provided by the trailing steerable wheels 6.

Modifications of this invention will be readily apparent to those skilled in the art. For example, the battery 3 may be replaced by an internal combustion engine driven generator to supply power to both the driving motor 10 and the steering motor 17. An internal combustion engine may be employed to drive a fluid-pressure pump and fluid-pressure motors may then be utilized for the driving motor 10 and the steering motor 17.

Those skilled in the art will also recognize that the controls for the driving and the steering motors have to be selected to accommodate the particular disability of the user of the wheelchair. For example, if the user has control of his fingers, then finger operated controls may be employed to effect the selective energization of the driving motor in either direction and/or the steering motor in either direction. If the handicapped occupant can only move his legs or alternatively, his head, then power controls responsive to such movement will be mounted on the wheelchair frame to produce selective energization of the driving motor 10 and steering motor 17 for the primary ground-engaging wheels 5 to produce forward or rearward movement of the wheelchair and turning in any desired direction.

The castering wheels may be mounted forwardly relative to the primary ground-engaging wheels without effecting the steering of the wheelchair, due to the fact that steering is always accomplished by the relative rotational speeds of the large power driven, ground-engaging wheels. All such modifications are intended to be included within the scope of the appended claims.

We claim:

1. A powered wheelchair comprising:
frame means defining a seat and transversely disposed bearing means;
a pair of shafts respectively journaled in said bearing means for rotation about a horizontal axis, each shaft projecting inwardly and outwardly beyond said bearing means;

a pair of primary ground engaging wheels respectively secured to the outwardly projecting portions of said shafts;

ground engaging caster wheels mounted on said frame in spaced relation to said primary ground engaging wheels;

means on the inwardly projecting ends of said shafts for respectively mounting two sets of planet gears of two planetary gear systems, said planet gears having horizontal axes of rotation and being angularly spaced about the axis of the respective shaft;

each of said inwardly projecting ends of said shafts defining a bearing mounting bore;

a sun gear structure having two oppositely projecting, coaxial shaft elements respectively journaled in said bearing mounting bores;

a sun gear mounted on each said shaft element and engagable with adjacent set of planet gears;

a pair of ring gears having internal teeth respectively cooperable with said two sets of planet gears;

each of said ring gears having coaxial external teeth;

a reversible driving motor mounted on said frame;

means for drivingly connecting said reversible driving motor with said sun gear, whereby said primary ground engaging wheels may be concurrently driven in either direction by selective energization of said reversible motor when said ring gears are secured against movement;

a reversible steering motor mounted on said frame; and gear train means for connecting said steering motor to said external teeth of both of said ring gears to rotate said ring gears in opposite directions to effect steering of said frame by the resulting difference in the rotational speed of said primary ground engaging wheels.

2. The apparatus of claim 1 wherein:

a battery is mounted on said frame; and means for selectively operating said reversible driving motor and said reversible steering motor by said battery.

3. The apparatus of claim 1 wherein said primary ground engaging wheels are located forwardly of the center of gravity of the wheelchair with an occupant in the seat and said caster wheels are located rearwardly of said center of gravity.

4. The apparatus of claim 1 wherein said gear train means comprises:

a first gear element driven by said steering motor;

said first gear element meshing with the external teeth of one of said ring gears; and a second gear element interconnecting the external teeth on the other of said ring gears and said first gear element.

5. The apparatus of claim 4 further comprising a splined shaft driven by said reversible steering motor, said splines extending only along a limited length of said splined shaft;

said first gear element being axially shiftable on said splined shaft from a first position engaging both said splines and said second gear element to a second position disengaged from both said splines and said second gear element, thereby permitting both said ring gears to free wheel to accommodate non-powered movement of said ground engaging primary wheels of the wheelchair; and means for axially shifting said first gear element between said first and second positions.

6. The apparatus of claim 1 wherein said gear train includes a non-reversible worm gear, thereby locking both said ring gears against movement except by said steering motor.

7. The apparatus of claim 5 wherein a non-reversible worm gear is connected intermediate said reversible steering motor and said first gear element, thereby locking both said ring gears against movement except by said reversible steering motor.

8. A powered wheelchair comprising:

frame means defining a seat and transversely spaced bearing means;

a pair of shafts respectively journaled in said bearing means for rotation about a horizontal axis, said shafts projecting axially inwardly and outwardly beyond said bearing means;

a pair of primary ground engaging wheels respectively secured to the outwardly projecting portions of said shafts;

secondary ground engaging castering wheel means mounted on said frame in longitudinally spaced relation to said primary ground engaging wheels;

a pair of identical planetary drive systems respectively connected to the inwardly projecting ends of said shafts;

a first reversible motor mounted on said frame;

first gear means connecting said pair of planetary drive systems to said first reversible motor to concurrently drive said primary ground engaging wheels in a selected direction of rotation;

each said planetary drive system including a ring gear;

a second reversible motor;

second gear means connecting said second reversible motor to drive said ring gears in opposite directions, thereby creating a rotational velocity differential of said primary ground engaging wheels to steer the wheelchair in a selected direction.

9. The apparatus of claim 8 wherein said second gear means includes a non-reversible worm gear, thereby causing said primary ground engaging wheels to be driven at the same velocity and direction by said first reversible motor.

10. The apparatus of claim 9 further comprising means for selectively disconnecting said ring gears from said non-reversible worm gear, thereby disconnecting said primary ground engaging wheels from both said first and said second reversible motors to permit manual movement of the wheelchair.

* * * * *